United States Patent Office 2,721,439
Patented Oct. 25, 1955

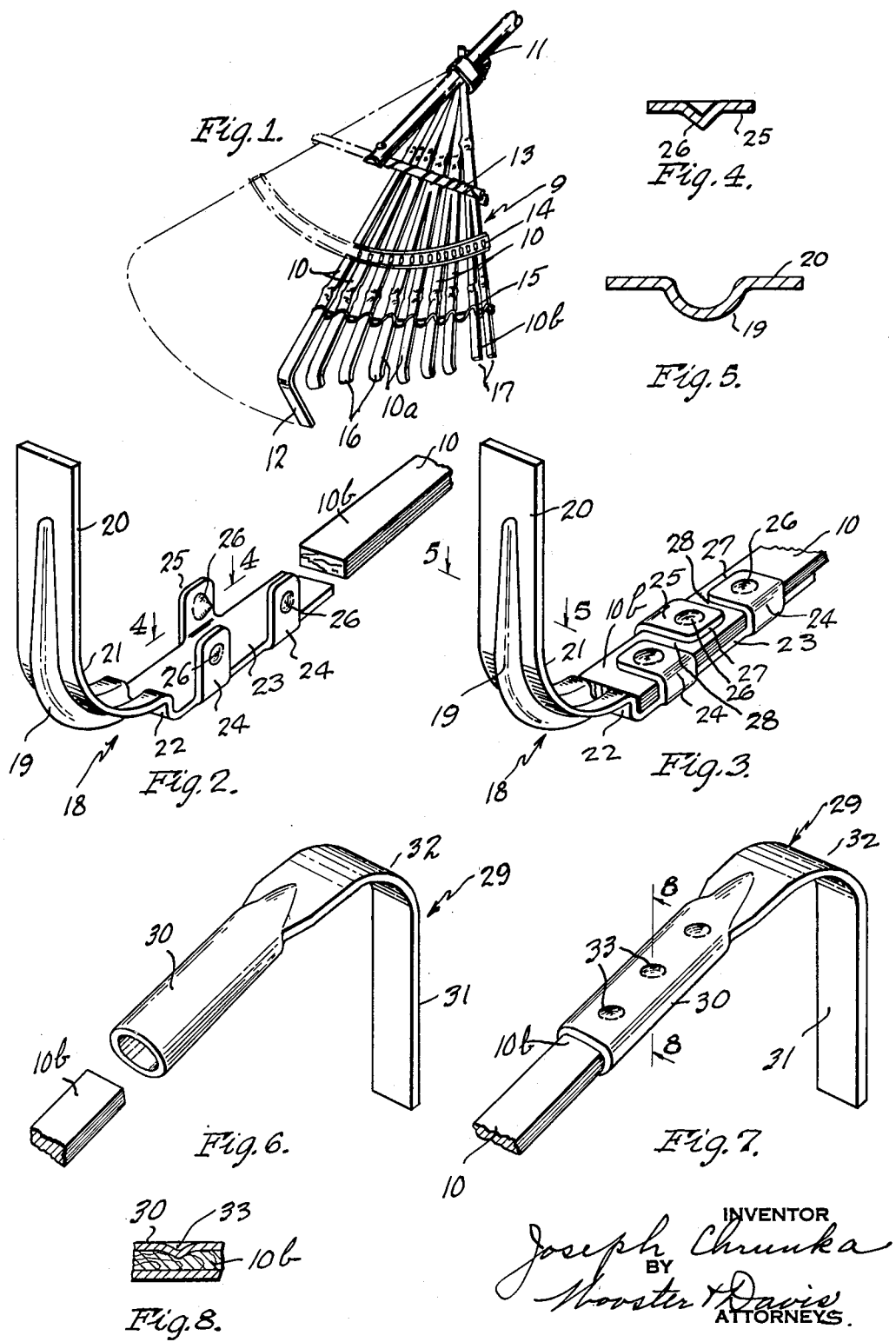

2,721,439
ATTACHABLE CLAW FOR BAMBOO RAKE

Joseph Chrunka, Bridgeport, Conn.

Application June 17, 1953, Serial No. 362,226

4 Claims. (Cl. 56—400.17)

This invention relates to bamboo rakes, and particularly to a detachable claw or tooth which may be applied to the flexing members of this type of rake when the bent or hooked ends or claws of the rake are worn, to thus renew them for further use.

The experience of gardeners and estate maintenance men has established the superiority of the split bamboo type of lawn rake over that of metal rakes of a similar type because of the inherent soft flexing action provided by the bamboo flexing members, a plurality of which make up the sweep portion of the rake, and also because of the lightness of the complete assembly. The bamboo has the disadvantage, however, in that the arched or curved ends of the flexing members comprising the claws or teeth of the rake wear readily and cannot readily be rebent to form new claws or teeth without the use of bending jigs and the application of heat. It is apparent that this cannot be easily or economically accomplished by the layman, and also would result in the shortening of the flexing members of the rake, resulting in a stiff, inefficient implement. Because of these reasons many rakes are discarded each year when the claws or teeth are worn, but the flexing members are otherwise in perfect condition for several years of service. On large estates a dozen or more of these rakes may be discarded in a single season, representing an appreciable expenditure for this one item.

It is therefore an object of this invention to provide an attachable claw or tooth to replace or supplement the worn claws or teeth of a conventional type of split bamboo rake.

It is another object of the invention to provide a rake of this type with attachable claws or teeth which may be readily replaced when worn by new claws or teeth.

With the foregoing and other objects in view, I have devised the construction and arrangement illustrated in the accompanying drawing forming a part of this specification. It is, however, to be understood the invention is not limited to the specific details of construction and arrangement shown, but may embody various changes and modifications within the scope of the invention.

In this drawing:

Fig. 1 is a perspective view showing a conventional type of split bamboo rake illustrating wear on parts of the claws or teeth and also illustrating the first step in replacing or renewing the worn claws or teeth;

Fig. 2 is a perspective view on a larger scale of one form of a renewable claw capable of being applied to one of the flexible members of the rake;

Fig. 3 is a similar view showing it attached to the flexible member;

Figs. 4 and 5 are transverse sections substantially on lines 4—4 and 5—5 respectively of Figs. 2 and 3;

Fig. 6 is a perspective view showing a modified form of renewable claw or tooth;

Fig. 7 is a similar view showing it attached to one of the flexible members of the rake, and Fig. 8 is a partial section substantially on line 8—8 of Fig. 7.

For the sake of simplicity only a portion of the rake 9 is shown in Fig. 1, and comprises the usual flexible split bamboo members 10 arranged in a sort of spreading fan arrangement, connected at one end to a handle 11 and at their free outer ends being bent downwardly to form the claws or teeth 12 for the raking operation. These flexing members may also be connected or strengthened by transverse tying or connecting means 13, 14 and 15. The intermediate flexing members 10a illustrate the effect of wear on the claws or teeth of the flexing members, these claws or teeth being worn off to the point 16 just below the bend or arch in the flexing member, and they are therefore worn to the point of uselessness. In preparing these flexing members for the application of my renewable claw or tooth, this bent end portion 16 is cut off just above the bend, as indicated on the flexible members 10b, leaving square ends 17.

Figs. 2 to 5 show one form of renewable claw or tooth and how it is applied to the cut off or squared ends of the flexible members 10b. It comprises a metal claw or tooth 18 preferably of sheet metal of suitable thickness, but relatively thin gauge for lightness, and stiffness or strength is provided by a longitudinal rib 19 pressed into the claw or tooth portion 20 and extending around the intermediate arched or curved portion 21 to a shelf or abutment 22, an approximate cross section of the tooth being shown in Fig. 5. The abutment 22 comprises a double right angle bend in the body as shown, and serves the dual purpose of limiting the entrance of the bamboo member 10b and of forming a T trussing or strengthening section with the rib 19, the inner concave or U surface of this rib extending through the abutment 22 with the outer convex or U surface of this rib extending to and forming part of the abutment 22. The body portion 23 of this claw or tooth is provided at its opposite side edges with three laterally disposed lugs 24 and 25, two lugs 24 on one side, and a single intermediate lug 25 on the opposite side. These are so spaced that after the end 10b of the flexible member of the rake is inserted on top of the portion 23 between these lugs and with its free end against the abutment 22, these lugs may be bent over on top of this bamboo member as indicated in Fig. 3, with the lug 25 extending between the two lugs 24. The width of the member 23 and therefore the transverse distance between these lugs on their inner sides is sufficient to accommodate the maximum width of the flexible members 10b to which it is to be applied. When bent over the bamboo member as shown in Fig. 3, they effectively and firmly fasten the claw or tooth to the bamboo member, but since the clamping function of these lugs might not be sufficient to alone retain the claw in position, additional holding means is provided by coining or pressing conical shaped points 26 into the lugs inwardly, or lancing inwardly projecting prongs, for the purpose of piercing or embedding themselves into the bamboo member 10b when the lugs are clinched over.

It is to be noted, as shown in Fig. 3, that the free ends 27 of these lugs do not extend to the edge of the bamboo member when clinched over, and also that a space 28 is left between these lugs. The ends are therefore not exposed at the sides of the bamboo member where they could catch on other articles, and the spaces are provided for the insertion of a screwdriver or similar tool for the purpose of prying open or prying up the lugs without damage to the bamboo member when renewing the claws or teeth.

It will be clear that the operation of applying the claw or tooth to the end of the worn bamboo member is a very simple one and may be easily and quickly accomplished, and that the claws or teeth are firmly and effectively applied to the bamboo member and will renew them to their usual effectiveness, and will provide long wear for the renewed claws.

A somewhat modified form is shown in Figs. 6 to 8. In this form the shank or body portion of the claw or tooth 29, indicated at 30, is made tubular and may be formed either by rolling up a flat strip or it could be a seamless tube to receive the cut-off end 10b of the bamboo member. The claw or tooth portion is shown at 31 connected to this tubular or body portion by the arched or curved intermediate portion 32, and if desired this can be strengthened and stiffened by the longitudinal rib 19 the same as in the first form. After insertion of the bamboo member 10b the tubular body section is flattened or swaged onto the bamboo member as shown in Fig. 7, and one or more prick punchings 33 could be applied as an additional securing means. This operates the same as the device of Figs. 2 and 3 and is used and applied in the same manner.

It will be apparent from the above that this provides a very simple and effective means of renewing the worn claws or teeth of the split bamboo type of rake while retaining the advantages of the bamboo flexing members, and that the operation of applying them may be easily and quickly performed without special tools or apparatus, and that when applied they effectively add extended life to worn rakes at small cost and for several years of additional service.

Having thus set forth the nature of my invention, I claim:

1. A renewable claw for a bamboo rake including a series of flexing members, said claw comprising a tooth portion and a body portion connected by an intermediate bent portion, said body portion comprising a substantially flat member to receive and lie along one side of the straight free end portion of a flexing member of the rake, and securing lugs at the opposite side edges of the body portion and bendable over the flexing member to secure the claw thereto.

2. A renewable claw for a bamboo rake including a series of flexing members, said claw comprising a tooth portion and a body portion connected by an intermediate bent portion offset laterally to provide a stop shoulder at the inner end of the body portion, said body portion comprising a substantially flat member to receive and lie along one side of the straight free end portion of a flexing member of the rake with its free end against said shoulder, and laterally extending securing lugs on the opposite side edges of said body portion and foldable over the flexing member to secure the claw thereto.

3. A renewable claw for a bamboo rake including a series of flexing members, said claw comprising a tooth portion and a body portion connected by an intermediate bent portion, said body portion comprising a substantially flat member to receive and lie along one side of the straight free end portion of a flexing member of the rake, said connecting portion being laterally offset at the inner end of the body portion to form a limit stop for the free end of said flexing member, and securing means on the body portion for fastening it to the flexing member to secure the claw thereto.

4. A renewable claw for a bamboo rake including a series of flexing members, said claw comprising a tooth portion and a body portion connected by an intermediate bent portion, said body portion comprising a substantially flat member to receive and lie along one side of the straight free end portion of a flexing member of the rake, said connecting portion being laterally offset at the inner end of the body portion forming a limit stop for the free end of said flexing member, said intermediate portion being also provided with a longitudinal concavo-convex strengthening rib running into said shoulder, and securing lugs at the opposite side edges of the body portion foldable over the flexing member and provided with pointed projections to pierce this member and secure the claw thereto.

References Cited in the file of this patent

UNITED STATES PATENTS

| | | |
|---|---|---|
| 1,239,687 | Hanamma | Sept. 11, 1917 |
| 2,663,987 | Biener | Dec. 29, 1953 |